United States Patent [19]

Kato

[11] Patent Number: 5,655,177
[45] Date of Patent: Aug. 5, 1997

[54] IMAGE FORMER APPARATUS HAVING A FIXING TEMPERATURE IN A PRINTER MODE LOWER THAN IN A COPY MODE

[75] Inventor: Mitsuhisa Kato, Kawasaki, Japan

[73] Assignee: Kabushiki Kaisha Toshiba, Kawasaki, Japan

[21] Appl. No.: 500,621

[22] Filed: Jul. 11, 1995

[30] Foreign Application Priority Data

Jul. 14, 1994 [JP] Japan ................. 6-162321

[51] Int. Cl.$^6$ ................. G03G 15/20
[52] U.S. Cl. ................. 399/69
[58] Field of Search ................. 355/208, 282, 355/285; 219/216, 469, 470; 432/60; 399/2, 67, 69

[56] References Cited

U.S. PATENT DOCUMENTS

| | | | |
|---|---|---|---|
| 4,373,801 | 2/1983 | Itoh | 219/216 X |
| 4,549,803 | 10/1985 | Ohno et al. | 219/469 X |
| 5,001,519 | 3/1991 | Saito | 355/285 |
| 5,303,015 | 4/1994 | Sato | 355/285 |
| 5,321,481 | 6/1994 | Mathers | 355/282 X |
| 5,333,038 | 7/1994 | Mizoguchi et al. | 355/208 |

FOREIGN PATENT DOCUMENTS 60-142375  7/1985  Japan .

Primary Examiner—William J. Royer
Attorney, Agent, or Firm—Foley & Lardner

[57] ABSTRACT

A fixing device in an image forming apparatus can set its fixing temperature to 200° C. in the copy mode, and 180° C. to 160° C. in the printer mode. When print data is externally input, a print mode is set, and the copy mode can be set on the image forming apparatus side. Since a fixing temperature is selected in accordance with the mode, a deterioration in image quality due to a fixing operation can be prevented, and both a high fixing ratio and high image quality can be realized.

13 Claims, 9 Drawing Sheets

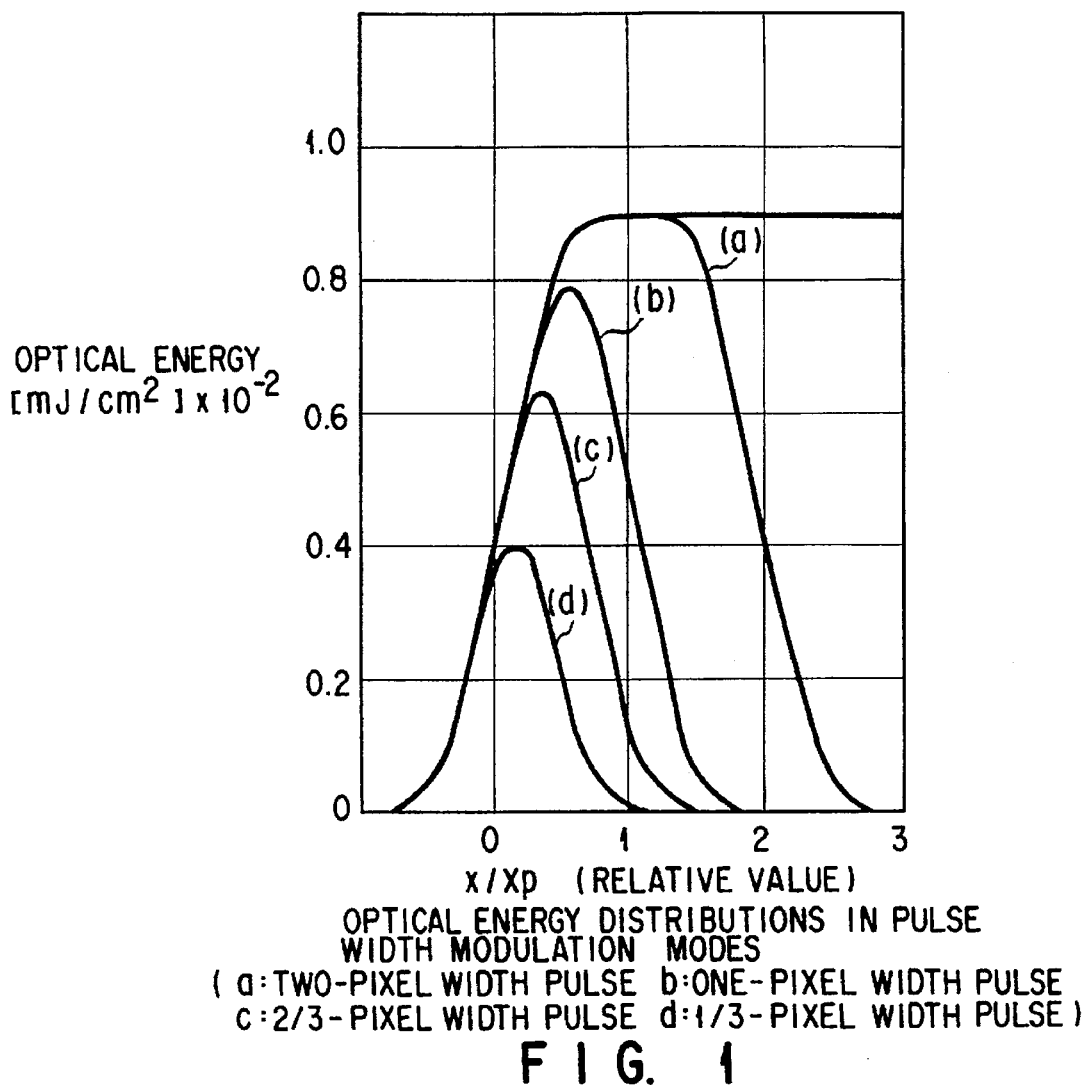
OPTICAL ENERGY DISTRIBUTIONS IN PULSE WIDTH MODULATION MODES
( a: TWO-PIXEL WIDTH PULSE  b: ONE-PIXEL WIDTH PULSE
  c: 2/3-PIXEL WIDTH PULSE  d: 1/3-PIXEL WIDTH PULSE )
F I G. 1
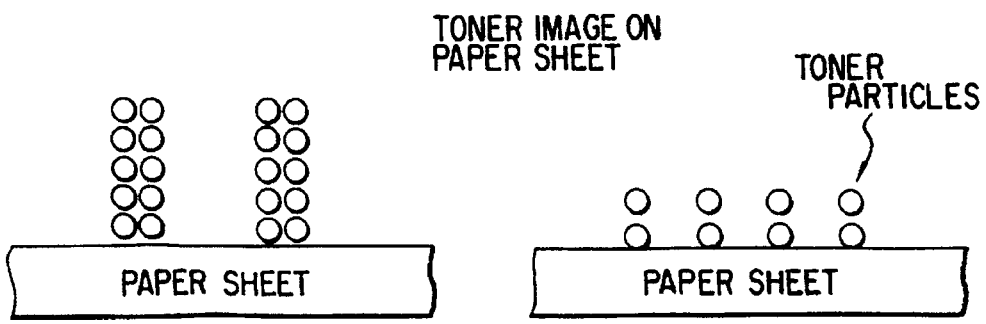
F I G. 2A          F I G. 2B

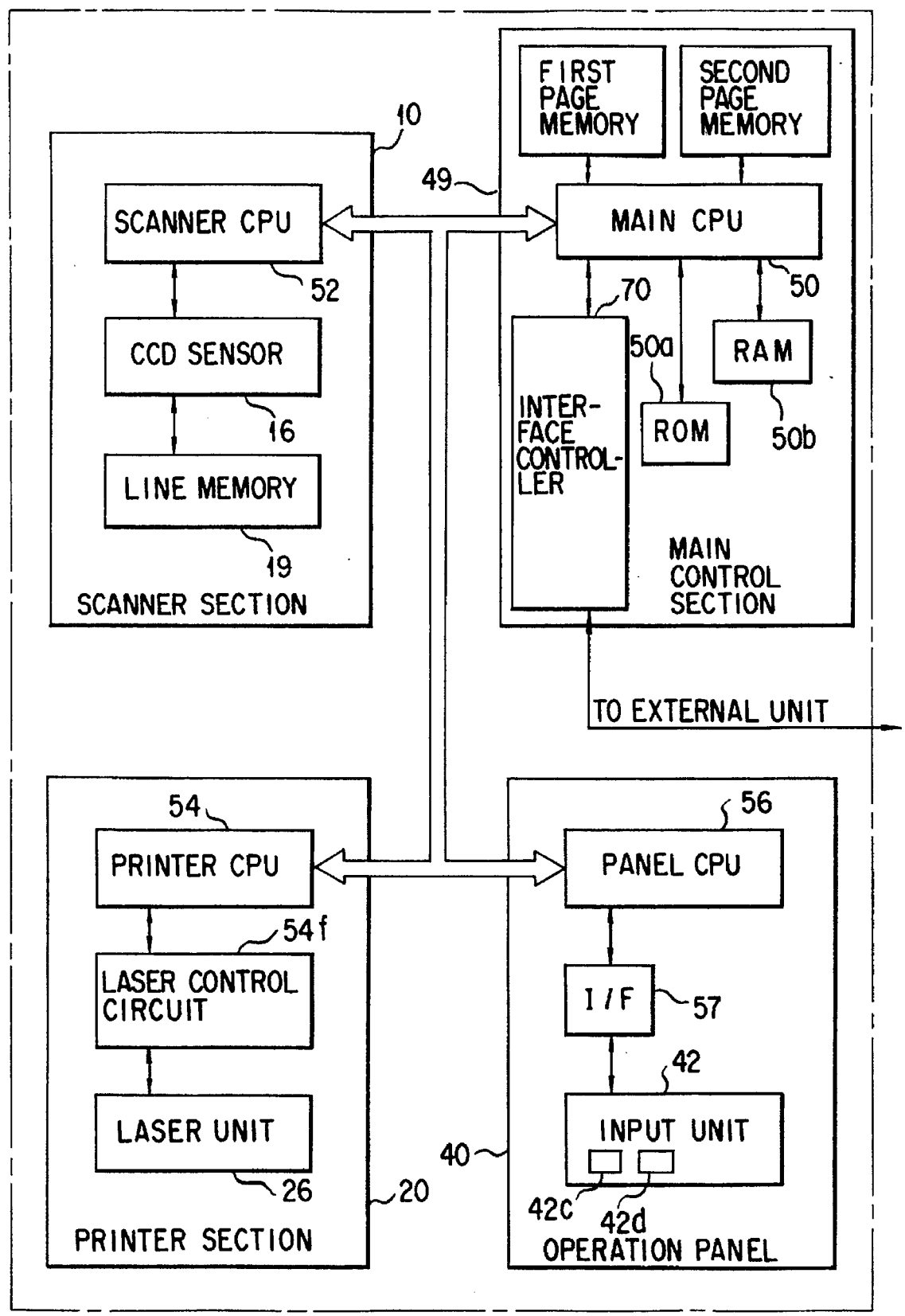
F I G. 5

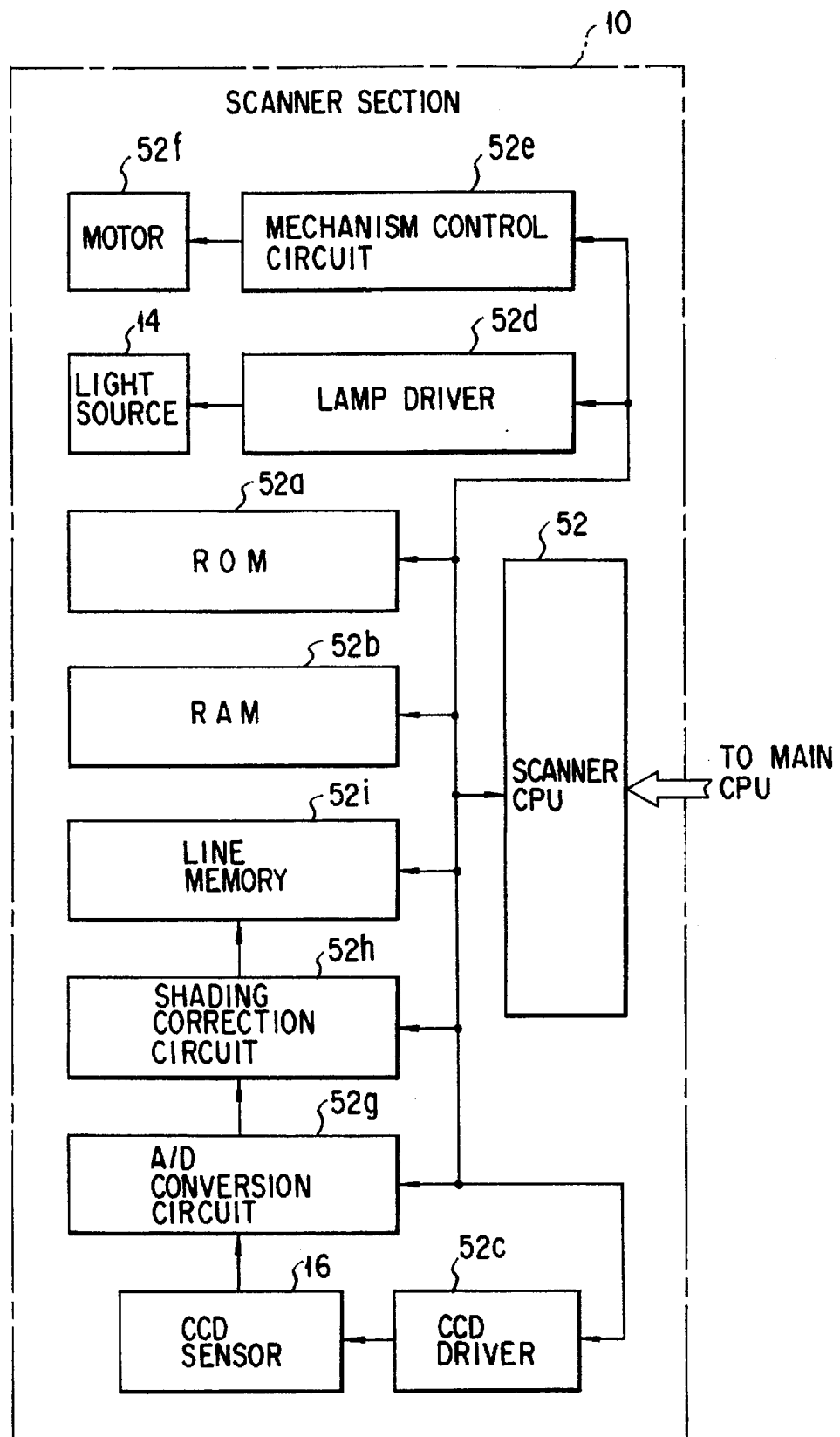
F I G. 7

IMAGE FORMER APPARATUS HAVING A FIXING TEMPERATURE IN A PRINTER MODE LOWER THAN IN A COPY MODE

BACKGROUND OF THE INVENTION

1. Field of the Invention

The present invention relates to an image forming apparatus and, more particularly, to an image forming apparatus such as a composite copying machine which can read an original image, generate a read signal, and form an image on a paper sheet in accordance with the read signal, and also can receive image data or font data from an external unit and form an image on a paper sheet in accordance with the data.

2. Description of the Related Art

Some electrophotographic image forming apparatus is of a digital scheme, in which an image converted into an electrical signal is formed as a latent image on a photosensitive drum with a laser beam. Such an image forming apparatus is being put into practice as a composite apparatus capable of performing operations based on, e.g., the copy mode of printing an original image read by a scanner and the printer mode serving as that of an output terminal of a computer.

In this image forming apparatus, a latent image formed on the photosensitive drum is developed into a toner image by the developing unit, and the toner image is transferred onto a paper sheet by the transfer unit. The image is then fixed to the paper sheet by the fixing unit. Through this process, an image is formed. The fixing unit generally employs a heat roller scheme constituted by a heat roller incorporating a heating element, and a press roller for applying pressure. In this scheme, a toner image is fixed to a paper sheet using heat and pressure.

In a digital copying machine for forming a latent image with a laser beam, with changes in heat and pressure in a fixing process, a toner image on a paper sheet is blurred and has an undesirable solid portion, posing problems in terms of image quality. In the copying machine, in particular, in the copy mode, since a laser beam is pulse-width-modulated, an image having many halftone portions, i.e., intermediate gradation portions, is produced as in an analog copying machine. In the printer mode, however, a binary monochrome image is produced. That is, toner images on paper sheets have different characteristics in the two modes. More specifically, in the printer mode, an image is generally expressed by one or more pixels. Laser beams for printing one or more pixels, e.g., two pixels and one pixel, have large pulse widths and relatively high optical energies in correspondence with two pixels and one pixel, as indicated by a curve (a) and a curve (b) in FIG. 1. In contrast to this, in the copy mode, an image is not necessarily expressed in units of pixels, but is generally expressed by not more than one pixel. Laser beams for printing not more than one pixel, e.g., a ⅔ pixel and a ⅓ pixel, have small pulse widths and relatively low optical energies in correspondence with the ⅔ pixel and the ⅓ pixel, as indicated by a curve (c) and a curve (d). For this reason, as shown in FIG. 2A, in the printer mode, a binary monochrome image is formed. In the copy mode, as shown in FIG. 2B, not only a binary image portion but also a halftone portion is formed. When the fixing characteristics in the two modes are compared, it is found that the fixing characteristics in the copy mode are inferior to those in the printer mode for the following reason. In the copy mode, as shown in FIG. 2B, toner particles are sparsely distributed on the paper sheet, and hence the bond strength between the toner particles and the paper sheet after a fixing operation using heat and pressure is low. In contrast to this, in the printer mode, toner particles are densely distributed on the paper sheet, and hence the toner particles soak into the paper sheet to be firmly bond thereto after melting, as shown in FIG. 2A. In this copying machine, if a fixing temperature is set in consideration of a halftone portion in the copy mode as the worst condition in terms of fixing characteristics, over-fixing occurs in the printer mode, resulting in blurring and formation of an undesirable solid portion of a toner image.

As described above, in an image forming apparatus having two operation modes, i.e., the printer mode of forming a latent image with a laser beam or the like and the copy mode of producing an image having a halftone portion obtained by pulse width modulation of a laser beam, if a fixing temperature is set in consideration of a halftone in the copy mode, over-fixing occurs in the printer mode. As a result, a toner image is blurred and has an undesirable solid portion.

SUMMARY OF THE INVENTION

It is an object of the present invention to provide an image forming apparatus which can form images with reliable image quality in both the printer mode and the copy mode without blurring a toner image and forming an undesirable solid portion thereof, which is caused by over-fixing, in the printer mode, and without degrading the fixing characteristics in the copy mode.

According to the present invention, there is provided an image forming apparatus comprising: read means for reading an image; reception means for receiving image data from an external unit; fixed image forming means including latent image forming means for forming an image on an image carrier, developing means for developing the image formed on the image carrier by the image forming means, transfer means for transferring the image developed by the developing means onto an image formation medium, and fixing means for fixing the image transferred onto the image formation medium by the transfer means; designating means for designating whether to perform image formation with respect to the image read by the read means or to perform image formation with respect to the image data received by the reception means; first processing means for performing image formation with respect to the image read by the read means through the fixed image forming means by setting a fixing temperature of the fixing means to a first temperature when image formation with respect to the read means is designated by the designating means; and second processing means for performing image formation with respect to the image received by the reception means through the fixed image forming means by setting the fixing temperature of the fixing means to a second temperature lower than the first temperature when image formation with respect to the image data received by the reception means is designated by the designating means.

According to the present invention, there is provided an image forming apparatus comprising: read means for reading an image; reception means for receiving image data from an external unit; fixed image forming means including latent image forming means for forming an image on an image carrier, developing means for developing the image formed on the image carrier by the image forming means, transfer means for transferring the image developed by the developing means onto an image formation medium, and fixing means for fixing the image transferred onto the image formation medium by the transfer means; designating means for designating whether to perform image formation with respect to the image read by the read means or to perform image formation with respect to the image data received by the reception means; first processing means for performing image formation with respect to the image read by the read means through the fixed image forming means by setting a fixing temperature of the fixing means to a first temperature when image formation with respect to the read means is designated by the designating means; and second processing means for performing image formation with respect to the image received by the reception means through the fixed image forming means by setting the fixing temperature of the fixing means to a second temperature lower than the first temperature by 10 to 20% when image formation with respect to the image data received by the reception means is designated by the designating means.

According to the present invention, there is provided an image forming apparatus comprising: read means for reading an image; reception means for receiving image data from an external unit; fixed image forming means including latent image forming means for forming an image on an image carrier, developing means for developing the image formed on the image carrier by the image forming means, transfer means for transferring the image developed by the developing means onto an image formation medium, and fixing means for fixing the image transferred onto the image formation medium by the transfer means; first processing means for, when an image is read by the read means, performing image formation with respect to the image read by the read means through the fixed image forming means by setting a fixing temperature of the fixing means to a first temperature; and second processing means for, when image data is received by the reception means, performing image formation with respect to the image received by the reception means through the fixed image forming means by setting the fixing temperature of the fixing means to a second temperature lower than the first temperature.

According to the present invention, there is provided an image forming apparatus comprising: read means for reading an image; reception means for receiving image data from an external unit; fixed image forming means including latent image forming means for forming an image on an image carrier, developing means for developing the image formed on the image carrier by the image forming means, transfer means for transferring the image developed by the developing means onto an image formation medium, and fixing means for fixing the image transferred onto the image formation medium by the transfer means; first processing means for, when an image is read by the read means, performing image formation with respect to the image read by the read means through the fixed image forming means by setting a fixing temperature of the fixing means to a first temperature; and second processing means for, when image data is received by the reception means, performing image formation with respect to the image received by the reception means through the fixed image forming means by setting the fixing temperature of the fixing means to a second temperature lower than the first temperature by 10 to 20%.

According to the present invention, in the digital image forming apparatus for forming an image on an image carrier with a laser beam, there are two modes, i.e., the copy mode, in which a laser beam is emitted upon pulse width modulation, and the printer mode, in which a laser beam is emitted according to only a binary scheme, and the fixing temperature of the fixing device during an operation in the printer mode is controlled to be lower than that during an operation in the copy mode by 10 to 20%.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a graph showing optical energy distributions in pulse width modulation modes;

FIGS. 2A and 2B are views respectively showing the characteristics of toner images on paper sheets;

FIG. 5 is a block diagram schematically showing the control system of the image forming apparatus in FIG. 3;

FIG. 7 is a block diagram schematically showing a scanner section in FIG. 5;

DETAILED DESCRIPTION OF THE PREFERRED EMBODIMENTS

An image forming apparatus according to an embodiment of the present invention will be described below with reference to the accompanying drawings.

Figure 3:
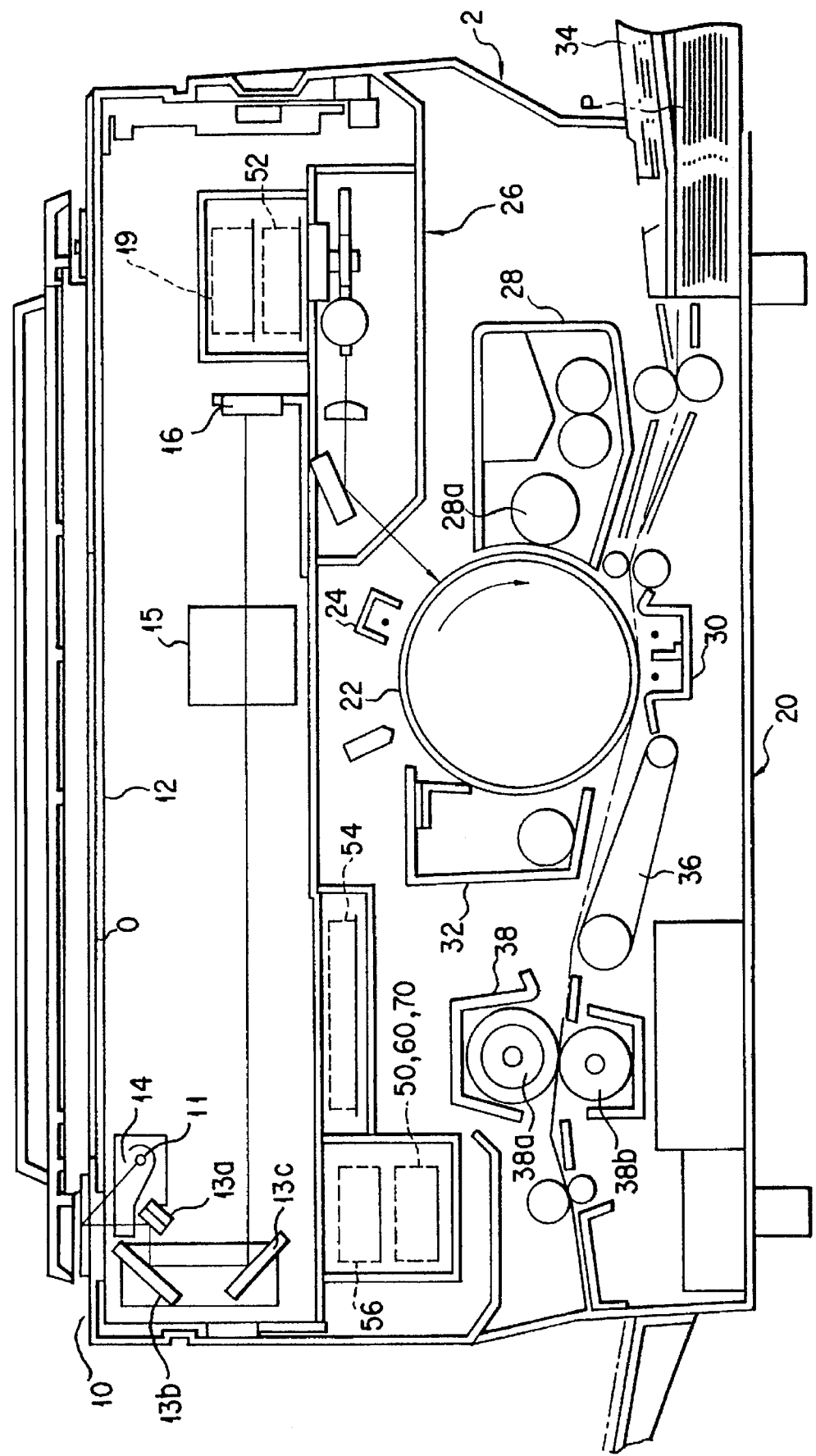
FIG. 3 is a sectional view schematically showing an image forming apparatus according to an embodiment of the present invention.

FIG. 3 is a schematic view showing the internal structure of an image forming apparatus according to an embodiment of the present invention. As shown in FIG. 3, an image forming apparatus 2 comprises a scanner section 10 for optically reading image information on an original, and a printer section 20 serving as an image forming section for outputting image information on a recording medium, i.e., a copy sheet, in accordance with an image signal read by the scanner section 10 or supplied from an external unit (not shown).

The scanner section 10 includes an original table 12 on which an original O to be copied is placed, and a light source 14 arranged below the original table 12 to illuminate the original O placed on the original table 12. In the scanner section 10, a light beam reflected by the original O illuminated by the light source 14 is photoelectrically converted by a CCD sensor 16. As a result, the reflected light beam containing image information is converted into an image signal. Note that a reflector 11 is arranged on a side of the light source 14 to efficiently focus an illumination light beam from the light source 14 onto the original O. Optical parts such as a plurality of mirrors 13a, 13b, and 13c and a lens 15 are arranged between the light source 14 and the CCD sensor 16. The mirrors 13a, 13b, and 13c serve to bend the optical path of a light beam reflected by the original O to direct the light beam to the CCD sensor 16. The lens 15 serves to focus the reflected light beam on the focusing surface of the CCD sensor 16. A carriage on which the light source 14, the reflector 11, and the mirror 13a are mounted, and a carriage on which the mirrors 13b and 13c are mounted are moved in the main scanning direction at different speeds to keep the optical path length from the original O to the CCD sensor 16 almost constant. As a result, images formed along the sub-scanning direction perpendicular to the main scanning direction are sequentially converted into image signals by the CCD sensor 16.

An original press member for bringing the original O into tight contact with the original table 12 is arranged on the upper portion of the original table 12. This original press member can be replaced with, e.g., a SDF, i.e., a semi-automatic document feeder, or an ADF, i.e., automatic document feeder in accordance with the size or copying ability of the image forming apparatus 2.

The printer section 20 includes a photosensitive drum 22 having a cylindrical shape. In a print operation, the photosensitive drum 22 is rotated in a predetermined direction by a motor (not shown) or the like, and is charged to a predetermined potential. In addition, a light beam is irradiated on the photosensitive drum 22 to change the potential of an area irradiated with the light beam, thereby forming an electrostatic latent image. A charger 24, a developing roller 28a, a transfer unit 30, and the like are arranged around the photosensitive drum 22 along a rotational direction. The photosensitive drum 22 which is charged to the predetermined potential by the charger 24 is irradiated with a laser beam from a laser unit 26. This beam has an illuminance of 75 nJ (joule) or 10 nJ and is ON/OFF-controlled in accordance with an image signal or a print signal, i.e., image information to be copied or output, from an image processing section (to be described later). An electrostatic latent image is then formed on the photosensitive drum 22 with a laser beam from the laser unit 26. This electrostatic latent image is developed when a developing agent, i.e., a toner, is supplied from the developing roller 28a of a developing unit 28 to the photosensitive drum 22. The toner image on the photosensitive drum 22, which is developed by the developing unit 28, is transferred, by the transfer unit 30, onto a recording medium, i.e., a copy sheet, fed from a recording medium feed section 34.

A cleaner unit 32 is arranged on the downstream side of the transfer unit 30, arranged around the photosensitive drum 22, in the rotational direction to remove the toner left on the surface of the photosensitive drum 22 and eliminate a change in potential, which has occurred on the photosensitive drum 22 upon irradiation of the laser beam, so as to prepare for the next print operation. The recording medium feed section 34 is arranged between the developing unit 28 and the transfer unit 30 to feed a copy sheet, to which the toner image formed on the photosensitive drum 22 is to be transferred, toward the transfer unit 30.

A fixing unit 38 and a convey unit 36 are arranged on the convey path for the copy sheet fed from the transfer unit 30. The fixing unit 38 fixes the toner image on the copy sheet. The convey unit 36 is arranged between the fixing unit 38 and the transfer unit 30 to convey the copy sheet toward the fixing unit 38. As the fixing unit 38, a unit of the fixing roller scheme is used. The fixing unit 38 includes a fixing roller 38a with a Teflon coat, which has an outer diameter of 40 mm and incorporates a heater, and a press roller 38b having an outer diameter of 40 mm and consisting of silicone rubber. When the copy sheet passes between the two rollers 38a and 38b, the toner image is fixed on the copy sheet with heat and pressure.

Figure 4:
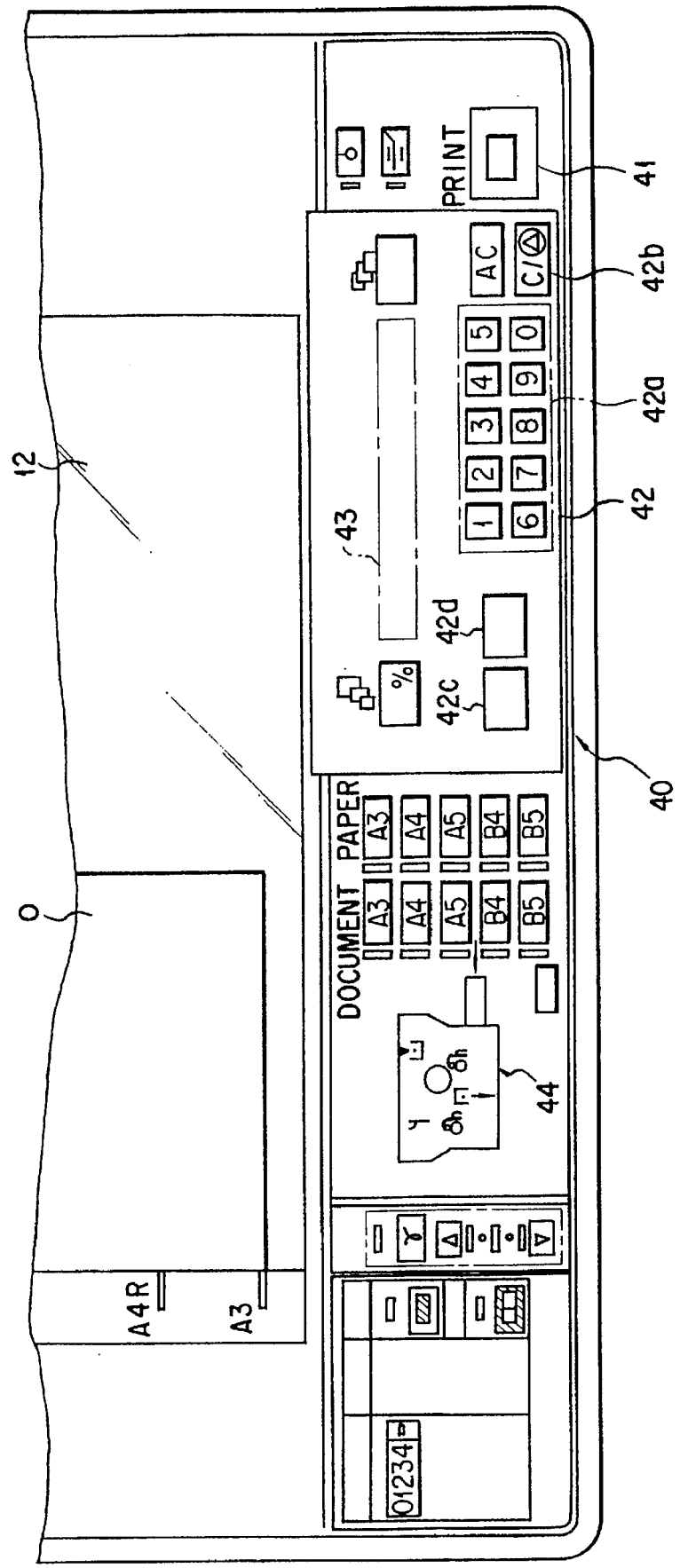
FIG. 4 is a schematic plan view showing an operation panel arranged on the image forming apparatus in FIG. 3.

The image forming apparatus 2 further comprises an operation panel 40 shown in FIG. 4, a main control section 49 shown in FIGS. 5 to 9, an interface used for connection with, e.g., a memory and an external unit, and the like.

FIG. 4 shows an example of the operation panel 40 incorporated in the image forming apparatus 2. This operation panel 40 is arranged in the image forming apparatus 2, more specifically, in the scanner section 10 or the printer section 20. The operation panel 40 includes a print key 41 for designating a copy start, and an input unit 42 having a plurality of push button switches or a transparent touch sensor panel on the screen of a color CRT which is used to input conditions for outputting an image in the image forming apparatus 2, e.g., the number of sheets to be copied or printed, designation of a partial copy operation, and the coordinates of a designated area. The operation panel 40 incorporates a display unit 44 for displaying a trouble in the image forming apparatus 2, e.g., a copy sheet jam in the apparatus 2. In addition, the input unit 42 has touch sensors 42a, 42b, 42c, 42d, . . . as a plurality of input keys on which, for example, graphic symbols, numbers, characters, character strings, and the like are displayed. These sensors are arranged in accordance with operation procedures associated with the image forming apparatus 2 or conditions to be input. For example, a ten-key pad 42a, a clear/stop key 42b, a printer mode key 42c, and a copy mode key 42d are arranged. The input unit 42 further includes a display section 43 for displaying operation prompts or input contents. For example, the number of copies, a copy magnification, and information indicating that a copy operation is ready are displayed on the display section 43. The ten-key pad 42a has numeral keys for setting the number of copies and a copy magnification. When the clear/stop key 42b is depressed, an input condition is cleared. When the clear/stop key 42b is depressed during a copy operation, the number of copies is cleared in accordance with the time during which the key is depressed, and the print operation of the printer section 20 is stopped. As will be described later, the printer mode is designated by the printer mode key 42c, and the fixing temperature in the fixing unit 38 is set to be 180° C. to 160° C. The copy mode is designated by the copy mode key 42d, and the fixing temperature in the fixing unit 38 is set to be 200° C.

Figure 6:
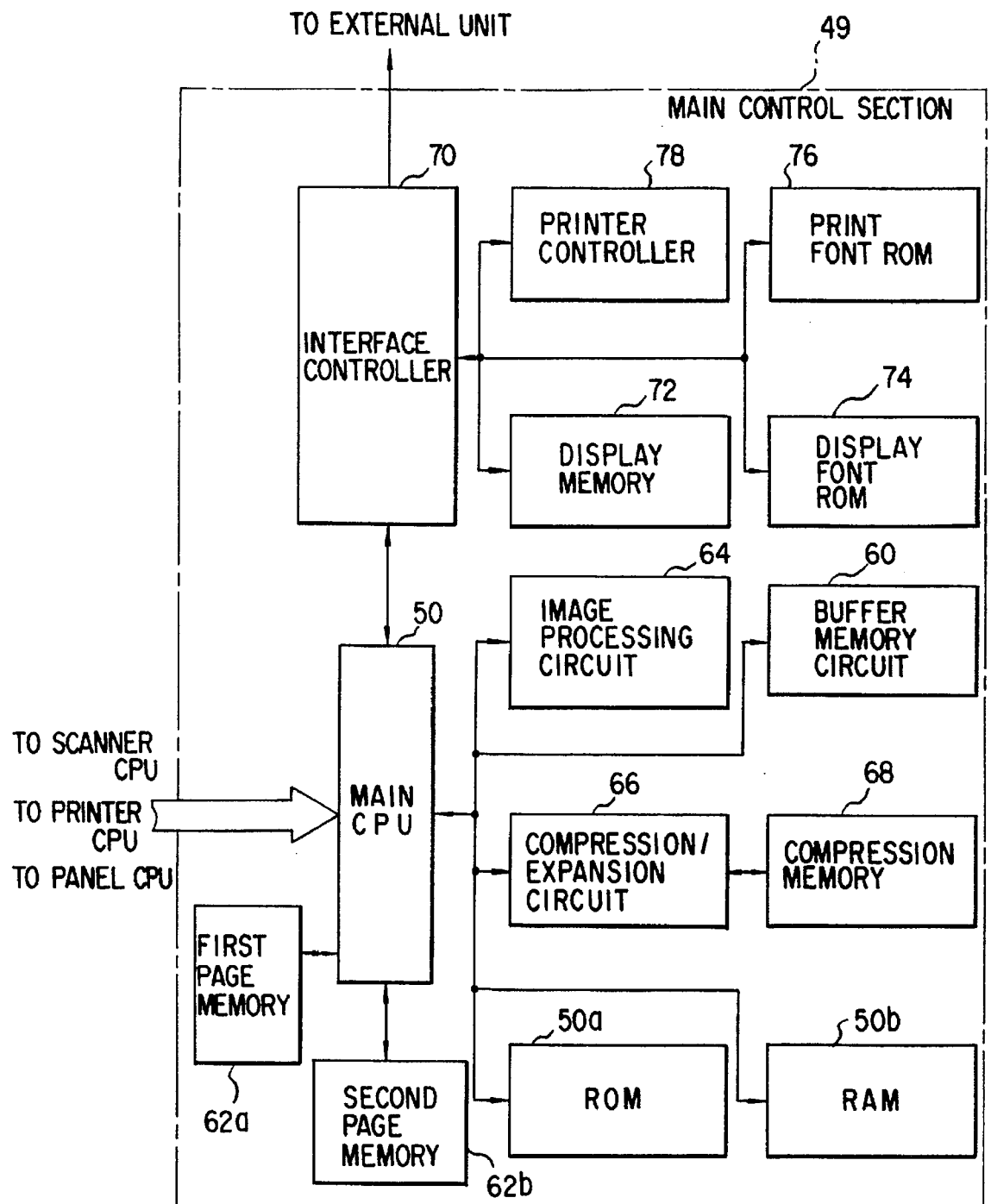
FIG. 6 is a block diagram schematically showing a main control section in FIG. 5.
Figure 8:
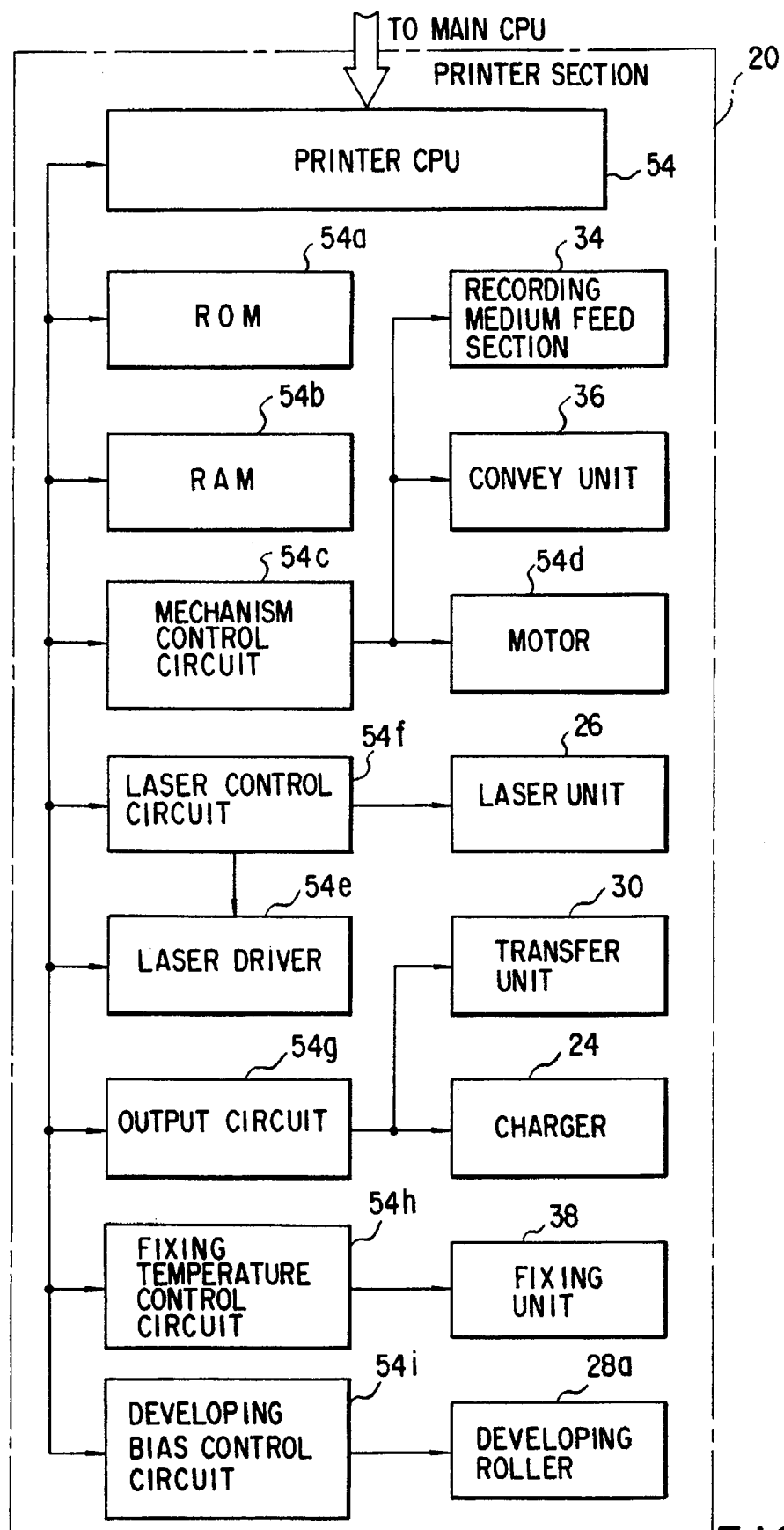
FIG. 8 is a block diagram schematically showing a printer section in FIG. 5.

FIG. 5 schematically shows the control system blocks of the image forming apparatus 2 in FIG. 3. As shown in FIG. 5, a main CPU 50 in a main control section 49 in the image forming apparatus 2 is mutually connected to a scanner CPU 52, a printer CPU 54, and a panel CPU 56. These CPUs 52, 54, and 56 respectively operate the scanner section 10, the printer section 20, and the operation panel 40 independently, and also operate them in synchronism with the main CPU 50. FIGS. 6, 7, and 8 are block diagrams respectively showing the main control section 49, the scanner section 10, and the printer section 20.

As shown in FIG. 6, a main ROM 50a and a main RAM 50b are connected to the main CPU 50. The main ROM 50a stores a sequence of control operations performed by the main CPU 50. The main RAM 50b stores control information, data, and the like which are processed by the main CPU 50. As shown in FIG. 6, a buffer memory circuit 60, first and second page memories 62a and 62b serving as image data memories, and the like are connected to the main CPU 50. Image information read by the scanner section 10, i.e., image data, and image data to be output to the printer section 20, i.e., print data, are temporarily stored in the buffer memory circuit 60 to be transferred. The first page memory 62a has an area capable of storing image data corresponding to a plurality of pages, and can store one-page image data from the scanner section 10. Similarly, the second page memory 62b has an area capable of storing image data corresponding to a plurality of pages, and can store one-page print data input from an external unit through an interface controller 70. Note that the one-page area of each of the first and second page memories 62a and 62b can be divided into a plurality of areas defined by row and column addresses or a plurality of line-like areas which can be divided by only row addresses. In addition, as shown in FIG. 6, an image processing circuit 64, a compression/expansion circuit 66, and the like are connected to the main CPU 50. The image processing circuit 64 processes an image signal. The compression/expansion circuit 66 compresses or expands an image signal by referring to a program stored in a compression memory 68.

In the image processing circuit 64, an image information signal stored in the first page memory 62a is subjected to processing, e.g., filtering, trimming, masking, mirror image processing, italicization processing, enlargement, reduction, edge emphasis, or font specifying processing, and the processed signal is converted into a print signal. As shown in FIG. 6, the interface controller 70 is connected to the main CPU 50. The interface controller 70 includes interfaces corresponding to many external units, e.g., a display (CRT) (not shown), a personal computer (not shown), and a facsimile apparatus (not shown) to connect them to the main CPU 50. A display memory 72, a display font ROM 74, a print font ROM 76, and a printer controller 78 are connected to the interface controller 70. The display memory 72 stores image data to be displayed on the display unit. The display font ROM 74 serves to display the data in the display memory 72 on the display. The print font ROM 76 serves to store print data from a personal computer and a number or symbol corresponding to a predetermined input in a page memory 62a and 62b. The printer controller 78 serves to develop code data supplied from the personal computer into printable image data through the printer section 20.

As shown in FIG. 7, the scanner section 10 comprises the scanner CPU 52 for controlling the overall scanner section 10, a ROM 52a storing a control program and the like, a RAM 52b for storing data, and a CCD driver 52c for driving the CCD sensor 16. The scanner section 10 further comprises a lamp driver 52d for turning on the light source 14, and a mechanism control circuit 52e for controlling the rotation of a motor 52f for moving the light source 14, the mirrors 13a, 13b, and 13c, and the like. In the scanner section 10, an analog signal from the CCD sensor 16 is converted into a digital signal by an A/D conversion circuit 52g, and this digital signal is input to a shading correction circuit 52h. As a result, variations in an output signal from the CCD sensor 16 or variations in threshold level with respect to an output signal from the CCD sensor 16 due to changes in ambient temperature and the like are corrected. The digital signal from the shading correction circuit 52h, which has undergone shading correction, is temporarily stored in a line memory 52i and is transferred to the main control section 49 in accordance with a request from the main CPU 50. Note that a digital signal converted by the A/D conversion circuit 52g can express a halftone image having each pixel expressed in 16 gradation levels.

As shown in FIG. 8, the printer section 20 comprises the printer CPU 54 for controlling the overall printer section 20, a ROM 54a storing a control program and the like, a RAM 54b for storing data, the feed section 34, the convey unit 36, and a mechanism control circuit 54c for controlling a driving mechanism for a motor 54d for rotating the photosensitive drum 22, and the like. The printer section 20 also includes a laser control circuit 54f having a laser modulation circuit. The rotation of the laser unit 26 is controlled by the mechanism control circuit 54c, and a laser driver 54e is also controlled by the mechanism control circuit 54c to turn on/off a laser beam from the semiconductor laser. A power supply voltage is applied from an output circuit 54g to the charger 24 and the transfer unit 30, and the power supply voltage applied to the fixing roller 38a of the fixing unit 38 is controlled by a fixing temperature control circuit 54h. In addition, the developing bias applied to the developing roller 28a of the developing unit 28 is controlled by a developing bias control circuit 54i. In the copy mode, in the laser modulation circuit of the laser control circuit 54f, one pixel is pulse-width-modulated in 16 levels to reproduce a halftone portion. The output circuit 54g causes the charger 24 to charge the surface of the photosensitive drum 22 to, e.g., −750 V or −650 V under the control of the printer CPU 54. The fixing temperature control circuit 54h can change the temperature of the fixing roller 38a in the range from 160° C. to 200° C. under the control of the printer CPU 54. For example, the fixing temperature control circuit 54h sets the temperature to 200° C. in the copy mode, and sets the temperature to 180° C. to 160° C. in the printer mode. The developing bias control circuit 54i sets the developing bias applied to the developing roller 28a to −500 V or −450 V under the control of the printer CPU 54. This image forming apparatus includes a type having a process speed of 216 mm/sec and a type having a process speed of 185 mm/sec.

The operation of the image forming apparatus 2 will be described in detail next. The image forming apparatus 2, shown FIGS. 3 to 8, can be used as a digital copying machine, an image input apparatus, i.e., a scanner, a printer apparatus, and a facsimile apparatus mutually or independently.

An operation of the image forming apparatus 2 serving as a digital copying machine in the copy mode will be described below. In the copy mode, the original O, e.g., a document to be copied, is placed on the original table 12 of the scanner section 10, and copy conditions are input through the operation panel 40. For example, while the copy mode key 42d is in an ON state, the number of copies and a copy magnification are set through the operation panel 40 controlled by the panel CPU 56. When the print key 41 is turned on, image information recorded on the original O is read. That is, the light source 14 is turned on through the lamp driver 52d, and the light source 14 and the mirrors are moved along the original table 12 upon rotation of the motor biased by the mechanism control circuit 52e. As a result, light beams reflected by the original O and containing image information are sequentially guided to the CCD sensor 16.

Each reflected light guided to the CCD sensor 16 is converted into an analog signal in units of pixels corresponding to the resolution of the CCD sensor 16 through the CCD sensor 16 which is being biased by the CCD driver 52c. The analog signal from the CCD sensor 16 is converted into a digital signal by the A/D conversion circuit 52g for converting an analog signal into a digital signal. This digital signal is subjected to shading correction in the shading correction circuit 52h for correcting variations in the CCD sensor 16 or variations in threshold level with respect to an output signal from the CCD sensor 16 owing to changes in ambient temperature and the like.

This digital signal having undergone shading correction is temporarily stored in the line memory 52i. The digital signal, i.e., the image data, stored in the line memory 52i is subjected first to timing matching under the control of the main CPU 50, and is then transferred to the buffer memory circuit 60, in which each one-page of information of the digital signal is stored in the first page memory 62a in units of pixels defined in accordance with the resolution of the CCD sensor 16. The image information signal stored in the page memory 62a is read out to the image processing circuit 64 under the control of the main CPU 50 to be subjected to processing, e.g., filtering, trimming, masking, mirror image processing, italicization processing, enlargement, reduction, edge emphasis, or font specifying processing. The processed signal is then converted into a print signal. This print signal is output to the laser control circuit 54f through the printer CPU 54 in units of pixels. A laser beam output from the laser unit 26 biased through the laser driver 54e is turned on/off in units of pixels in accordance with the image signal output to the laser control circuit 54f.

Meanwhile, in the printer section 20, when the print key 41 is turned on, a motor (not shown) is biased under the control of the main CPU 50 to rotate the photosensitive drum 22. At the same time, a predetermined charge is supplied from the charger 24 biased through the laser control circuit 54f to the photosensitive drum 22. For example, the surface potential of the photosensitive drum 22 is set to −750 V or −650 V. A copy sheet is fed from the feed section 34 through a solenoid or clutch biased through the mechanism control circuit 54c. A laser beam ON/OFF-controlled through the laser modulation circuit 54e is irradiated on the surface of the photosensitive drum 22, to which the predetermined charge is supplied, to form an electrostatic latent image on the photosensitive drum 22. This electrostatic latent image is visualized by a toner supplied through the developing unit 28. The resultant image is transferred as a toner image onto the copy sheet through the transfer unit 30. The developing bias of the developing unit 28 is set at −500 V or −450 V.

The toner image transferred onto the copy sheet is conveyed to the fixing unit 38 through the convey unit 36 and is fixed to the sheet through the fixing unit 38 whose temperature is controlled to 200° C. The copy sheet to which the toner image is fixed is discharged onto a discharge tray or sorter arranged outside the image forming apparatus 2.

The operation of the printer section 20 serving as a printer in the printer mode will be described below. In the printer mode, the print mode key 42c of the operation panel 40 is depressed. In response to the depression of the print mode key 42c, the main CPU 50 determines the print mode and allows reception of image data from an external unit. When image data is supplied from the external unit to the interface controller 70 in this state, the interface controller 70 develops the data into printable image data by using the printer controller 78 through the printer section 20. More specifically, in response to a data transfer request from the external unit, the main CPU 50 transmits a standby signal to the external unit through the interface controller 70 to allow reception of image data from the external unit. In response to this standby signal, the external unit transfers code data associated with a font, image data, and a control code to the main CPU 50 through the interface controller 70. The transferred code data and image data are temporarily stored in the buffer memory circuit 60. The code data is developed into image data based on the font by referring to the print font ROM 76 under the control of the printer controller 78. This developed image data based on the font is stored in the second page memory 62b, together with other image data.

The image data stored in the second page memory 62b is output to the laser control circuit 54f in units of pixels by the main CPU 50 through the printer CPU 54. A laser beam output from the laser unit 26 biased through the laser driver 54e is turned on/off in units of pixels by the image signal output from the laser control circuit 54f. Meanwhile, in the printer section 20, when the image data from the external unit is supplied to the interface controller 70, a motor (not shown) is biased under the control of the main CPU 50 to rotate the photosensitive drum 22. At the same time, a predetermined charge is supplied to the photosensitive drum 22 from the charger 24 biased through the laser control circuit 54f. In addition, a copy sheet as a recording medium is fed from the recording medium feed section 34 through a solenoid or clutch biased through the mechanism control circuit 54c.

When a laser beam having an illuminance of 75 nJ or 10 nJ and turned on/off through the laser modulation circuit 54e is irradiated on the surface of the photosensitive drum 22 to which the predetermined charge is supplied, an electrostatic latent image is formed on the photosensitive drum 22. This electrostatic latent image is developed with a toner supplied through the developing unit 28, and the resultant image is transferred as a toner image onto the copy sheet through the transfer unit 30. The developing bias of the developing unit 28 is set at −500 V or −450 V. The toner image transferred onto the copy sheet is conveyed to the fixing unit 38 through the convey unit 36 and fixed to the sheet through the fixing unit 38 whose temperature is controlled to 160° C. or to 180° C. The copy sheet to which the toner image is fixed is discharged onto a discharge tray or sorter arranged outside the apparatus 2.

Figure 9:
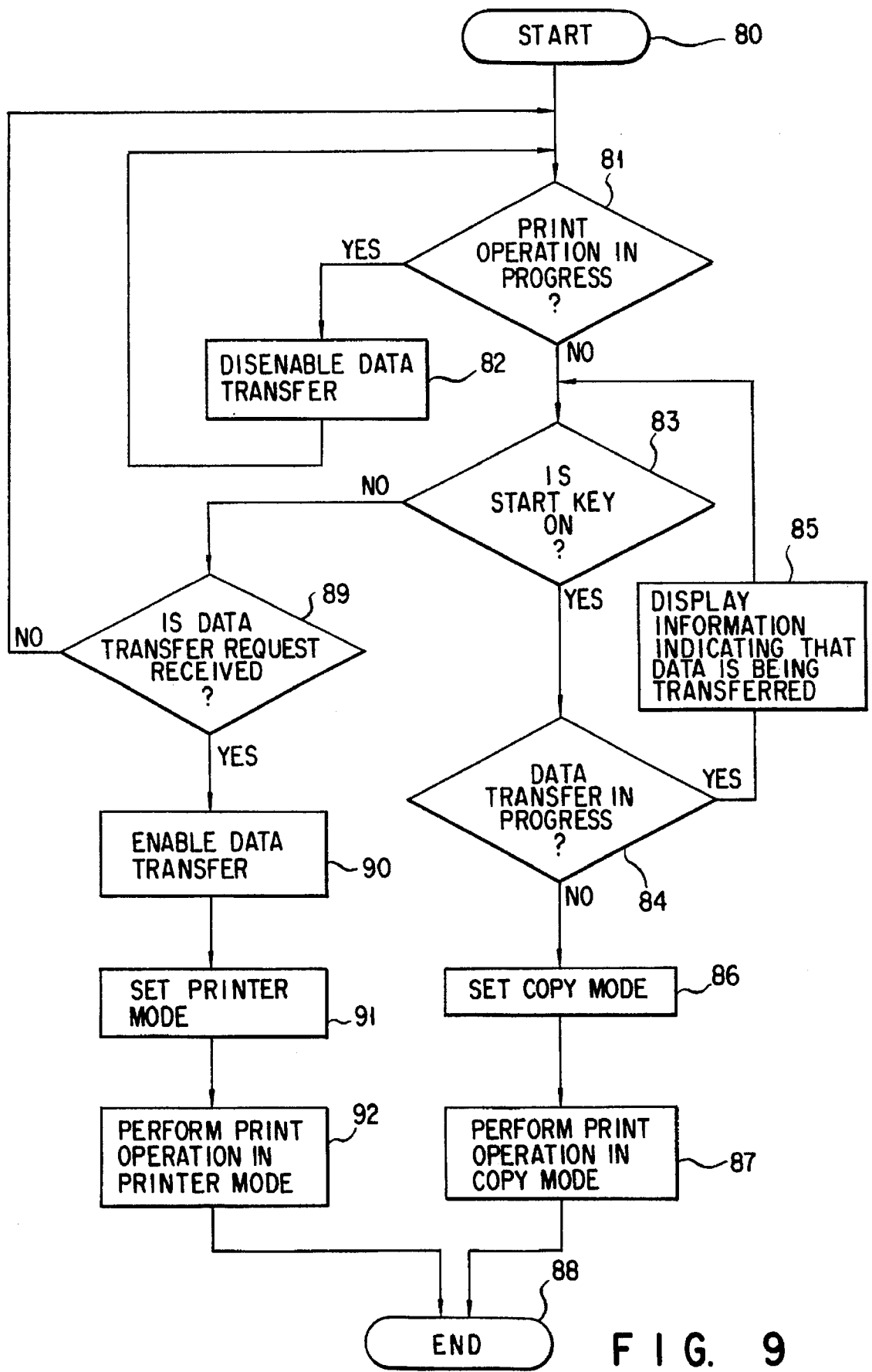
FIG. 9 is a flow chart showing the operation of an image forming apparatus according to another embodiment of the present invention.

The operation panel 40 shown in FIG. 4 has the printer mode key 42c and the copy mode key 42d. A print mode is designated with these keys. However, the keys are not necessarily required, and the main CPU 50 may detect the state of the printer section 20 to shift to the printer mode or the copy mode, as needed. The print mode key 41 is basically used to designate a copy mode. As shown in FIG. 9, when a program for executing the copy mode or the printer mode is started in step 80, the main CPU 50 checks in step 81 whether the printer section 20 is currently executing a print operation. If the printer section 20 is executing the print operation, the main CPU 50 supplies a disenable signal to an external unit through the interface controller 70 in step 82 to inhibit transfer of print data from the external unit to the main control section 49. If the printer section 20 is not performing a print operation, the main CPU 50 checks in step 83 whether the print start key 41 for designating the copy mode is depressed. If the print start key 41 is depressed, it is checked in step 84 whether print data is being transferred from the external unit to the main control section 49, i.e., a data transfer operation is being performed. If a data transfer operation is being performed, information indicating that data is being transferred is displayed on the display section 43 in step 85, and the depression of the start key 41 is canceled. If a data transfer operation is not being performed, a copy mode (step 86) described above is set in step 86, and a print operation is executed in the copy mode in step 87. Since the print operation in the copy mode has been described above, a detailed description thereof will be omitted. In step 88, the print operation in the copy mode is completed, and a series of programs are terminated. As described above, in this copy mode, the temperature of the fixing unit 38 is controlled to 200° C.

If the start key 41 is not depressed in step 83, it is checked in step 89 whether a data transfer request for transferring data from the external unit to the main CPU 50 through the interface controller 70 is received. If no data transfer request is received, the flow returns to step 81. If a data transfer request is received, a data transfer enable signal for allowing transfer of data is transmitted from the main CPU 50 to the external unit through the interface controller 70 in step 90. In step 91, a printer mode (step 92) is set. In response to this transfer enable signal, the external unit transfers print data to the main CPU 50. In step 92, a print operation in the printer mode is started. Since the print operation in the printer mode has already been described, a detailed description thereof will be omitted. In step 88, the print operation in the printer mode is completed, and a series of programs are terminated. As described above, in the printer mode, the temperature of the fixing unit 38 is controlled to 160° C. or to 180° C. which is lower than the temperature set in the copy mode.

In the above image forming apparatus, two print speeds, i.e., two process speeds, are set. The following table shows the peripheral speed of the photosensitive drum 22 and appropriate process conditions for a print operation in correspondence with each process speed.

|  | First Embodiment | Second Embodiment |
| --- | --- | --- |
| Process Speed | 216 mm/sec | 185 mm/sec |
| Surface Potential of Photosensitive Drum | −750 V | −650 V |
| Developing Bias | −500 V | −450 V |
| Laser Illuminance | 7.5 nJ | 10 nJ |

In this case, fixing characteristics were evaluated on the basis of a residual ratio obtained from copy images by using a general fastness test device (see JIS - L0801). In the copy mode, the above evaluation was performed by using half-tone images obtained by pulse width modulation. In the printer mode, the evaluation was performed by using density patches of five levels based on dot images. In evaluating image quality, for example, level evaluation of the reproducibility of a line pair having a width of 100 μm is performed with the eye to obtain thin line characteristics, and the obtained characteristics are used as criteria for formation of an undesirable solid portion or blurring upon a fixing operation. These results are shown in FIGS. 10 and 11.

Figure 10:
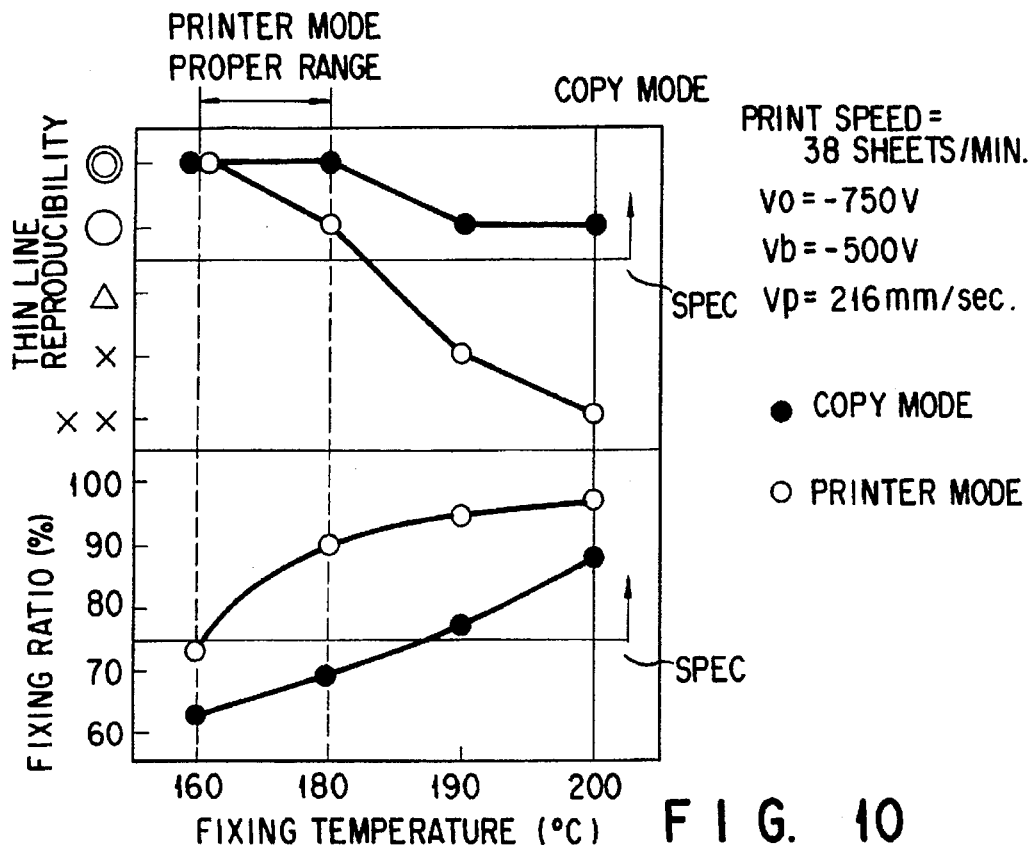
FIG. 10 is a graph showing thin line reproducibility and fixing ratios with respect to fixing temperatures at a given process speed.
Figure 11:
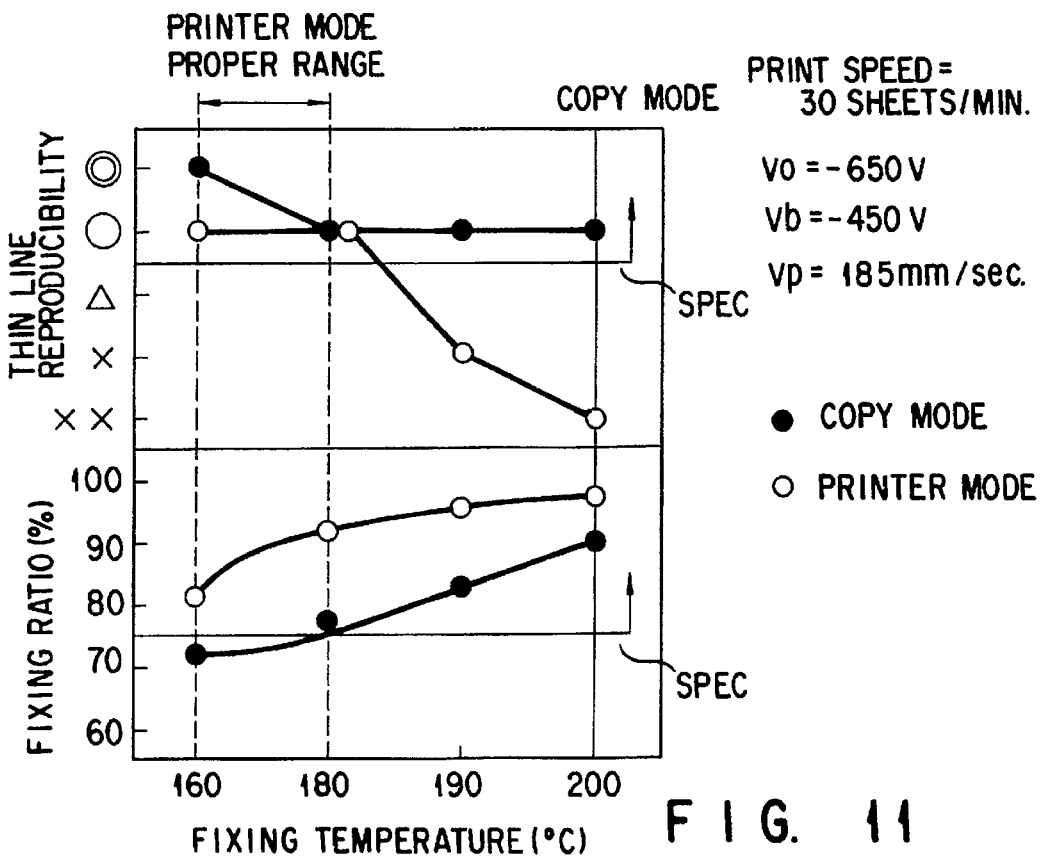
FIG. 11 is a graph showing thin line reproducibility and fixing ratios with respect to fixing temperatures at a process speed different from that in FIG. 9.

As is apparent from FIGS. 10 and 11, even if two print speeds are set, the image quality can be improved and a high fixing ratio can be maintained in the printer mode by setting the fixing temperature in the printer mode to be lower than that set in the copy mode by 10% to 20%.

As described above, a deterioration in image quality due to a fixing operation can be prevented, and both a high fixing ratio and high image quality can be realized by controlling the fixing temperature of the fixing device to 200° C. in the copy mode, and to 180° C. or to 160° C. in the printer mode. That is, in the digital copying machine for forming a latent image on the photosensitive drum by using a laser beam, there are two modes, i.e., the copy mode, in which a laser beam is emitted upon pulse width modulation, and the printer mode, in which a laser beam is emitted according to only a binary scheme. In this apparatus, the fixing temperature of the fixing device during an operation in the printer mode is controlled to be lower than that during an operation in the copy mode, thereby maintaining good fixing characteristics in the two modes and preventing formation of an undesirable solid portion and blurring of images upon a fixing operation.

As has been described above, according to the present invention, there is provided an image forming apparatus which can form an image with reliable image quality in both the printer mode and the copy mode without blurring and formation of an undesirable solid portion of a toner image, which is caused by over-fixing, in the printer mode, and without degrading the fixing characteristics in the copy mode.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:
   means for reading first image data to generate a first image;
   means for receiving second image data corresponding to a second image from an external unit;
   means for selecting a first mode of forming the first image corresponding to the first image data and a second mode of forming the second image corresponding to the second image data;
   means for forming a latent image corresponding to one of the first and second images on an image carrier;
   means for developing the latent image formed on the image carrier to provide a developed image;
   means for transferring the developed image onto an image transfer medium to provide a transferred image;
   means for heating the image transfer medium at one of first and second temperatures which can be selected whereby said heating means fixes the transferred image onto the transfer medium, the second temperature being lower than the first temperature; and
   means for setting a temperature of said heating means to the first temperature when the first mode is selected and to the second temperature when the second mode is selected.

2. An apparatus according to claim 1, wherein the second temperature is set to be lower than the first temperature by 10 to 20%.

3. An apparatus according to claim 1, wherein said selecting means includes first and second selection keys for respectively designating the first and second modes and generating first and second mode signals, and said setting means sets one of the first and second temperatures in response to one of the first and second mode signals.

4. An apparatus according to claim 1, wherein said selecting means includes means for setting the second mode in response to a data transfer request from said external unit.

5. An apparatus according to claim 1, wherein said selecting means includes a start key for selecting the first mode during a period except for periods during which an image forming operation is performed and data is received by said receiving means.

6. An image forming apparatus comprising:
   first forming means for forming a first image defined by a first arrangement of pixels onto a medium with developing particles;

second forming means for forming a second image defined by a second arrangement of the pixels onto the medium with the developing particles, the developing particles being more stacked on each pixel of the first image than that of the second image; and means for heating the first and second images on the medium at first and second temperatures to fix the first and second images onto the medium, respectively, the first temperature being lower than the second temperature.

7. An apparatus according to claim 6, further comprising selecting means for selecting one of the first and second forming means.

8. An apparatus according to claim 7, wherein said selecting means includes first and second selection keys for respectively designating first and second modes and generating first and second mode signals, and setting means for setting one of the first and second temperatures in response to one of the first and second mode signals.

9. An apparatus according to claim 8, wherein said selecting means includes means for setting the second mode in response to a data transfer request from an external unit.

10. An apparatus according to claim 8, wherein said selecting means includes a start key for selecting the first mode during a period except for periods during which an image forming operation is performed and data is received by receiving means.

11. An image forming apparatus comprising:

means for uniformly charging a photosensitive member to provide a charged photosensitive member;

means for exposing the charged photosensitive member with a light beam;

means for controlling the exposing means under one of first and second modes, said exposing means being controlled in the first mode such that the light beam is modulated at a binary level to form a first latent image on the charged photosensitive member and said exposing means being controlled in the second mode such that the light beam is modulated at multi levels to form a second latent image on the charged photosensitive member;

means for supplying developing toners to the charged photosensitive member to develop the first and second latent images, thereby forming first and second developed toner images;

means for transferring the first and second developed toner images to a medium; and means for heating the first and second developed toner images on the medium at first and second temperatures to fix the first and second toner images onto the medium, respectively, the first temperature being lower than the second temperature.

12. An apparatus according to claim 11, wherein the second temperature is set to be lower than the first temperature by 10 to 20%.

13. An apparatus according to claim 11, wherein the controlling means includes selecting means for selecting one of the first and second modes.

* * * * *